United States Patent
Mooij et al.

(10) Patent No.: US 6,379,818 B1
(45) Date of Patent: *Apr. 30, 2002

(54) BRAZING SHEET PRODUCT AND METHOD OF ITS MANUFACTURE

(75) Inventors: Joop Nicolaas Mooij, Castricum; Adrianus Jacobus Wittebrood, Velserbroek; Jacques Hubert Olga Joseph, Amsterdam, all of (NL)

(73) Assignee: Corus Aluminium Walzprodukte GmbH, Koblenz (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/573,980

(22) Filed: May 19, 2000

(30) Foreign Application Priority Data

May 21, 1999 (EP) .............................. 99201649
Mar. 10, 2000 (EP) .............................. 00200868

(51) Int. Cl.$^7$ .......................... B32B 15/20; C25D 5/44; B32K 35/28

(52) U.S. Cl. ................. 428/648; 428/658; 428/650; 428/680; 428/935; 228/219; 228/221; 228/262.51; 205/177; 205/181; 205/185

(58) Field of Search .................. 428/680, 648, 428/658, 654, 650, 935; 228/221, 219, 262.51; 205/176, 177, 181, 185

(56) References Cited

U.S. PATENT DOCUMENTS

| | | | |
|---|---|---|---|
| 2,821,014 A | | 1/1958 | Miller ..................... 29/197.5 |
| 3,482,305 A | * | 12/1969 | Dockus et al. ............ 29/487 |
| 3,597,658 A | * | 8/1971 | Rivera ................. 317/241 R |
| 3,963,454 A | | 6/1976 | Singleton, Jr. .......... 29/197.5 |
| 3,970,237 A | * | 7/1976 | Kostas ..................... 228/208 |

(List continued on next page.)

FOREIGN PATENT DOCUMENTS

| | | |
|---|---|---|
| EP | 0227261 | 7/1987 |
| FR | 2354171 | 1/1978 |
| FR | 2617868 | 1/1989 |
| GB | 1176688 | 1/1970 |

OTHER PUBLICATIONS

Wernick and Pinner, "The Surface Treatment and Finishing of Aluminium and its Alloys", 5th edition, vol. 1, pp. 181–182 and pp. 191–203 (1988).

Wernick and Pinner, "The Surface Treatment and Finishing of Aluminium and its Alloys", 5th edition, vol. 2, pp. 1006–1022 (Ch. 14–15) (1988).

General Textbook by Wernick and Pinner, "The Surface Treatment and Finishing of Aluminium and its Alloys", 5th edition, vol. 2, pp. 1023–1071, Nov. 1988.

Bureau of Mines Technology, "Aluminium Soft–Soldering", 2301 N.T.I.S. Tech Notes (manufacturing), 1985, Jan. No. 1G, Springfield, VA, USA pp. 12–13. (no month).

SAE Paper No. 880446 by B.E. Cheadle and K.F. Dockus Inert Atmosphere Fluxless Brazing of Aluminum Heat Exchangers, ICE, Detroit, Michigan, Feb. 29–Mar. 4, 1988 pp. 1–11.

Primary Examiner—John J. Zimmerman
(74) Attorney, Agent, or Firm—Stevens, Davis, Miller & Mosher, LLP

(57) ABSTRACT

A brazing sheet product and a method of manufacturing a brazing sheet product in which a layer comprising nickel is plated onto a surface of a clad layer made of an aluminium-silicon alloy containing silicon in the range of 2 to 18 weight %, wherein the surface is pre-treated by application of a bonding layer comprising zinc or tin. The application of the bonding layer may be by a zincate or a stannate treatment. The use of lead to promote wetting during brazing can be reduced or avoided, or other elements such as bismuth can be used.

38 Claims, 2 Drawing Sheets

U.S. PATENT DOCUMENTS

| | | | |
|---|---|---|---|
| 4,028,200 A | | 6/1977 | Dokus ........................ 204/435 |
| 4,157,154 A | * | 6/1979 | Scott et al. .................. 228/140 |
| 4,164,454 A | | 8/1979 | Schober ....................... 204/28 |
| 4,388,159 A | * | 6/1983 | Dockus et al. ................ 204/33 |
| 4,602,731 A | * | 7/1986 | Dockus ....................... 228/121 |
| 4,721,653 A | | 1/1988 | Oda et al. ................. 428/472.2 |
| 5,069,980 A | | 12/1991 | Namba et al. ............... 428/654 |
| 5,422,191 A | | 6/1995 | Childree ...................... 428/654 |
| 5,466,360 A | * | 11/1995 | Ehrsam et al. .............. 205/170 |
| 5,601,695 A | * | 2/1997 | Muranushi .................. 205/213 |
| 6,129,262 A | * | 10/2000 | Cooper et al. .............. 228/208 |

* cited by examiner

BRAZING SHEET PRODUCT AND METHOD OF ITS MANUFACTURE

CROSS-REFERENCE

The present application claims priority under 35 USC §119 from European Patent Application No. 99201649.3, filed May 21, 1999 and European Patent Application No. 00200868.8, filed Mar. 10, 2000, both of which are incorporated herein by reference.

1. Field of the Invention

The invention relates to a method of manufacturing a brazing sheet product in which a layer comprising nickel is plated onto a surface of a clad layer made of an Al—Si alloy containing Si in the range of 2 to 18 weight %. The invention also relates to a brazing sheet product obtained by the method and to a brazed assembly comprising at least one component made of the brazing sheet product.

2. Background of the Invention

For the purpose of this invention brazing sheet is to be understood as a core sheet, for example of aluminium or aluminium alloy, having on at least one side a brazeable aluminium alloy. Typical brazeable aluminium alloys useful as such a clad layer are the Aluminium Association (AA) 4xxx-series alloys, typically having Si in the range of 2 to 18 weight %. The brazeable aluminium alloys may be coupled to the core alloy in various ways known in the art, for example by means of roll bonding, cladding, or semi-continuous or continuous casting.

Controlled Atmosphere Brazing (CAB) and Vacuum Brazing (VB) are the two main processes used for industrial scale aluminium brazing. Industrial vacuum brazing has been used since the 1960's, while CAB became popular in the early 1980's after the introduction of the Nocoloc (trade mark) brazing flux. Vacuum brazing is an essentially discontinuous process and puts high demands on material cleanliness. The disruption of the oxide layer present is mainly caused by the evaporation of magnesium from the clad alloy. There is always more magnesium present in the furnace then necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the Nocoloc flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after shaping of the assembly parts. No additional brazing fluxing operations have to be carried out. Presently, only one process for flux-less brazing is used on an industrial scale. The material for this process can be for example standard brazing sheet made from an AA3xxx-series core alloy clad on both sides with a cladding of an AA4xxx-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts, presumably exothermically, with the underlying aluminium. The nickel can be applied by using a shim of nickel between the two parts to be joined or can be deposited by electroplating. When electroplating is used the adherence of the nickel should be sufficient to withstand typical shaping operations being used in for example heat exchanger manufacture.

The processes for nickel-plating of aluminum brazing sheet are known from each of U.S. Pat. Nos. 3,970,237, 4,025,200, 4,164,454, and SAE-paper no. 880446 by B. E. Cheadle and K. F. Dockus. According to these documents, nickel is preferably deposited in combination with lead. The lead addition is used to improve the wettability of the clad alloy during the brazing cycle. An important characteristic of these plating processes is that the nickel is preferentially deposited on the silicon particles of the clad alloy. To obtain sufficient nickel for brazing on the surface, the clad alloy should contain a relatively large number of silicon particles to act as nuclei for the nickel deposition. It is believed that to obtain sufficient nucleation sites before pickling a part of the aluminium in which the silicon particles are embedded should be removed by chemical and/or mechanical pre-treatment. This is believed a necessary condition to obtain a sufficient nickel coverage to serve as nuclei for the wetting action of the brazing or clad alloy. On a microscopic scale the surface of the Si-containing cladding of the brazing sheet is covered with nickel globules.

Some other disclosures of Ni-plating found in the prior art literature will be mentioned below.

General textbook by Wernick and Pinner, "The Surface Treatment and Finishing of Aluminium and its Alloys", 5th edition, Volume 2, pp.1023–1071. This textbook describes in general immersion processes for plating on aluminium.

Paper by the Bureau of Mines Technology, "Aluminum Soft-Soldering", 2301 N.T.I.S. Tech Notes (manufacturing), January, 1985, No. 1G, Springfield, Va., USA, pp.12–13. This paper describes a method of manufacturing aluminium for soft-soldering wherein the aluminium surfaces are joined by conventional tin-lead solder. The method includes firstly cleaning the aluminium surface carefully prior to the zinc application. Secondly a thin zinc coat is deposited and subsequently electroplated with an alloy of nickel-copper. After the nickel-copper plating has been accomplished, soldering using normal procedures can be accomplished.

FR-A-2,617,568 describes a method of manufacturing aluminium product with a brazeable surface coating of tin or a tin-bismuth alloy, wherein the product is provided with an intermediate layer. This intermediate layer is composed of a first layer of zinc and a second layer of nickel, which nickel has been deposited by electrolysis from a neutral electrolyte. Here, the underlying aluminium or aluminium alloy is not melted in the brazing process.

SUMMARY OF THE INVENTION

It is an object of the present invention to provide a method of manufacturing nickel-plated brazing sheet product, comprising a core provided on at least one side with a clad of an Al—Si alloy comprising Si in the range of 2 to 18 weight %, by which method good adhesion of the surface of the clad layer to the nickel is obtained.

It is also an object of the invention to provide a brazing sheet product having a core sheet and filler material, to be melted during brazing, comprising a clad layer of an Al—Si alloy and a nickel layer on the clad layer, in which there is good adhesion of the nickel layer to the clad layer.

In accordance with the invention in one aspect there is provided a method of manufacturing a brazing sheet product, comprising the step of plating a layer comprising nickel onto a surface of a sheet comprising a core sheet and a clad layer on the core sheet, the clad layer being made of an aluminium alloy containing silicon in an amount in the range 2 to 18% by weight and the surface being a surface of the clad layer, the method including a pre-treatment of said surface before the plating step. This method is characterised in that the pre-treatment comprises the step of applying a bonding layer comprising zinc or tin on the surface.

By the zinc or tin pretreatment step of the invention an effective bond between the aluminium alloy clad layer and the layer comprising nickel is formed, the bond remaining effective during subsequent deformation of the brazing sheet, for example by bending. The coverage of the nickel layer is no longer dependent on the surface characteristics of the bare clad layer. Furthermore the method may be carried out in a continuous process. The product obtained by this method is suitable for flux-less brazing under controlled atmosphere conditions.

The invention is based in, part on the insight that to obtain a well-bonded nickel layer on the Si-containing clad layer of the brazing sheet product so that the bond remains effective under large deformation, pretreatment of the clad layer is extremely important. The prior art processes apparently aimed at applying the nickel in a distributed form, principally to the silicon particles at the surface of the clad layer, rather than trying to achieve a uniform nickel layer. In the present invention the surface of the Si-containing clad alloy is altered in such way that the nickel coverage is independent of the silicon particles at its surface. The nickel plating does not take place on the silicon particles but on the applied layer comprising zinc or tin. Since the nickel thus is deposited on the total surface of the clad layer the necessary reaction before brazing can take place much more easily as compared to the process of the prior art. The zinc or tin applied does not interfere at all during the brazing process, and may contain a component to assist the brazing, as described below. Since the nickel is deposited smoothly and uniformly on the surface, the use of lead to promote wetting during brazing can be reduced or avoided, or other elements such as bismuth may be used for this purpose. A further important advantage of the nickel or nickel-lead deposited smoothly and uniformly on the surface is that the total amount of nickel to be applied in order to achieve good flux-less brazing can be reduced. Another advantage is that the complete surface coverage avoids any difficulty caused by aluminium oxide at the surface of the clad layer.

While it is in general known to apply a zinc layer prior to nickel-plating of articles, it is believed that this has not been done in a nickel-plated aluminium alloy clad brazing sheet product, in which as discussed above it has been thought necessary to plate the nickel directly on the Sicontaining clad layer.

Very good results may be obtained with an immersion zincate treatment or immersion stannate treatment, often also referred to as displacement plating. A further advantage is that this treatment lends itself to application in a continuous process operation.

Preferably the duration of the zincate treatment or stannate treatment is in the range of 1 to 300 seconds.

Preferably the temperature of the bath during the zincate treatment or stannate treatment is in the range of 10 to 50° C., and more preferably in the range of 15 to 30° C.

Zincate treatments are known per se in the art for applying layers onto aluminium, for example as known from "Oppervlaktebehandelingen van aluminium" by T. van der Klis and J. W. du Mortier published by the Vereniging voor Oppervlaktetechnieken voor Materialen, Bilthoven, NL, 3rd edition 1992, pp. 406–409. A simple basic composition for a zincate pickle comprises 40–50 g/l ZnO and 400–500 g/l NaOH. Also, other commercial available zincate baths can be used, for example ChemTec (tradename) 024202, also known as the Bondal process, and ChemTec (tradename) 24195, also known as a cyanide-free Bondal process.

Stannate treatments are known in the art for depositing a layer on aluminium to facilitate soldering, to improve electrical conductivity, and also to give a lubricated surface to aluminium alloy pistons for internal combustion engines during the running-in period. Typical alkaline stannate solutions comprise 5–300 g/l sodium or potassium stannate.

Preferably in the method of the invention the applied layer comprising zinc or tin has a thickness up to 05 $\mu$m, more preferably up to 0.3 $\mu$m (30 nm), and most preferably in the range of 0.01 to 0.15 $\mu$m (10–150 nm). In the best results obtained a thickness of about 30 nm has been used. A coating thickness of greater than 0.5 $\mu$m requires a prolonged treatment time, e.g. for displacement plating, and is thought to have no further advantages for improving the adhesion.

The zinc or tin layer applied in the method of the invention may be essentially a pure zinc or tin layer or may be primarily zinc or tin (e.g. at least 50 weight %). Minor amounts of impurity elements or deliberately added elements may be present, as discussed in more detail below. Typically impurity elements are present at less than 10%, more usually less than 5% by weight in the zinc or tin layer. The zinc or tin layer may contain less than 1% of other elements.

Following the application of the bonding layer according to the method of the invention the aluminium brazing sheet is typically plated with nickel, nickel-lead, nickel-cobalt or nickel-lead-cobalt by electroplating in an alkaline solution. Good results may be obtained when the electroplating process for nickel or nickel-lead deposition comprises one or more of:

(a) bath temperature 20–70° C., preferably 20–30° C.;
(b) pH 7.0–12.0, preferably pH 10.0–12.0, and more preferably about 10.5;
(c) current density of 0.1–10.0 A/dm$^2$, preferably 0.5–4.0 A/dm$^2$;
(d) plating time 1 to 300 s, preferably 30 to 100 s;
(e) bath composition comprising 3–200 g/l nickel sulfate, preferably 50 g/l nickel sulfate, 10–100 g/l nickel chloride, preferably 50 g/l nickel chloride, 60–300 g/l sodium citrate, preferably 100 g/l sodium citrate, 0.05–10.0 g/l lead acetate, preferably 1.0 g/l lead acetate, 5–150 ml/l ammonium hydroxide (30% by weight), preferably 75 ml/l ammonium hydroxide, As alternative for the sodium citrate 60–300 g/l sodium gluconate, preferably 150 g/l sodium gluconate may be used, for the lead acetate 0.05–5 g/l lead citrate or bismuth lactate, preferably 1.0 g/l lead citrate or bismuth lactate may be used. In case of nickel-cobalt or nickel-lead-cobalt plating the bath composition may further comprise cobalt chloride in the range of 10–100 g/l, preferably 50 g/l.

Using these parameters in combination with the bonding layer in accordance with the invention, a well-bonded layer comprising essentially nickel or nickel-lead is applied to the brazing sheet, the bonding remaining effective under large deformation of the nickel-plated brazing sheet and the deposition of the plating layer being independent of the silicon particles at the surface of the clad layer. A further advantage is that it is possible to perform a continuous process.

Alternatively, after the application of the bonding layer according to the method of the invention the aluminium brazing sheet is plated with nickel or nickel-lead by electroplating in an acidic solution. Good results may be obtained when in the electroplating process for nickel or nickel-lead deposition the parameters comprise one or more of:

(a) bath temperature 20–70° C., preferably 40–60° C.;

(b) pH in the range of 3 to 5, preferably 4 to 5; and (c) current density of 0.1–10.0 A/dm$^2$, preferably 0.5 to 5.0 A/dm$^2$;

(d) plating time 1 to 300 seconds, preferably 20 to 100 seconds;

(e) bath composition comprising 5–400 g/l nickel sulphate, preferably 240–300 g/l nickel sulphate, 10–100 g/l nickel chloride, preferably 40–60 g/l nickel chloride, 5–100 g/l boric acid, preferably 25–40 g/l boric acid.

Such an electroplating process is often referred to in the act as the Watt's process. Using these parameters in combination with the bonding layer in accordance with the invention, a well-bonded layer comprising essentially nickel or nickel-lead may be applied to the brazing sheet, the bonding remaining effective under large deformation of the nickel-plated brazing sheet and the deposition of the plating layer being independent of the silicon particles at the surface of the clad layer. A further advantage is that it is possible to perform a continuous process.

Alternatively, following the application of the bonding layer according to the method of the invention the aluminium brazing sheet is nickel or nickel-lead plated by electroplating in an acid solution comprising nickel or nickel-lead using alkylsulphonic acid electrolytes, and preferably methanesulphonic acid.

Alternatively, following the application of the bonding layer according to the method of the invention the aluminium brazing sheet is plated with nickel or nickel-lead by electroplating in a sulfamate solution or in a lead sulfamate solution. Typically the sulfamate solution comprises 50–500 g/l nickel sulfamate, 0.05–30 g/l lead sulfamate, 15–50 g/l boric acid, and optionally wetting agents. Bath temperatures are in the range of 20 to 70° C.

Alternatively, following the application of the bonding layer according to the method of the invention the aluminium brazing sheet is plated with nickel or nickel-lead by electroplating in a fluoborate or in a lead fluoborate (Pb(BF$_4$)$_2$) solution. Typically nickel fluoborate is present in the range 50–500 g/l, optionally lead fluoborate in the range of 0.5–30.0 g/l, and further optionally fluoboric acid in the range 1–50 g/l, boric acid 15–50 g/l, and further optionally a wetting agent. Bath temperatures are in the range of 20 to 80° C., and preferably 40 to 70° C. An advantage is that this solution, like some others here described, does not require the use of ammonium hydroxides.

Alternatively, following the application of the bonding layer according to the method of the invention the aluminium brazing sheet is plated with nickel or nickel-lead by electroplating in a bath comprising 50–500 g/l nickel acetate, 0.05–30 g/l lead acetate, 15–50 g/l boric acid, up to 200 ml/l glycolic acid (70%), 20–100 g/l sodium acetate, and optionally wetting agents.

The invention further provides a brazed assembly comprising at least one component made of the brazing sheet product produced by the method in accordance with the invention described above.

In another aspect of the invention there is provided a brazing sheet product having a core sheet, a clad layer on the core sheet made of an aluminium alloy containing silicon in an amount in the range 2 to 18% by weight, and a layer comprising nickel on the outer surface of the clad layer, characterised by a layer comprising zinc or tin as a bonding layer between the outer surface of the clad layer and the layer comprising nickel.

The layer comprising nickel is preferably an electroplated layer. The adhesion of the layer comprising nickel applied on the layer comprising zinc or tin is excellent and can withstand relatively severe shaping operations without the occurrence of delamination.

Preferably in the brazing sheet product according to the invention the layer comprising zinc or tin has a thickness up to 0.5 $\mu$m, more preferably up to 0.3 $\mu$m, and most preferably in the range of 0.01 to 0.15 $\mu$m. A coating thickness of greater than 0.5 $\mu$m requires a prolonged treatment time for plating.

Preferably in this brazing sheet product the layer comprising nickel has a thickness up to 2.0 $\mu$m, preferably up to 1.0 $\mu$m, and more preferably up to 0.5 $\mu$m. A coating thickness of greater than 2.0 $\mu$m requires a prolonged treatment time for plating, may result in wrinkling of the nickel layer and is thought to have no further advantages during brazing. A preferred minimum thickness for this Ni-containing layer is 0.3 $\mu$m.

Preferably in the brazing sheet product the material which on brazing becomes molten, known as filler material, in particular the nickel layer and/or the zinc or tin layer comprise one or more elements to reduce the surface tension of the molten brazing alloy during brazing. In the invention it has been found surprisingly that contrary to the teaching of the prior art, it is not necessary to add lead as an alloying element to the Ni-layer in order to promote the wetting action of the brazing alloy. Nevertheless, lead and other suitable elements, for which bismuth is preferred to most, may be added to the nickel layer or the zinc or tin layer or to both. This has various advantages from the manufacturing point of view of the brazing sheet.

In the filler material as a whole therefore, there may be present, in weight %, at least one of Bi 0.01 to 0.5, preferably 0.05 to 5

Mg 0.2 to 2.0

Sb 0.01 to 0.5, preferably 0.05 to 5.

The zinc or tin layer itself may thus comprise one or more additional elements selected from the group consisting of bismuth, lead, lithium and antimony. The amount of the additional element or elements in total may be up to 50%, but preferably is less than 25%, e.g. in the range 1 to 25%.

The clad layer may comprise, in weight %, Si in the range of 2 to 18%, preferably 7 to 18%, and Mg in the range of up to 6%. Preferably the Mg is in the range of 0.5 to 5%. Further alloying elements may be added such as, but not limited to, Cu, Zn, Sr and Mn in suitable ranges. It has been found that in use of the brazing sheet the presence of Mg in the cladding has no detrimental effects during brazing. This is a major improvement over known brazing sheets. It allows for the design of a cladding which may contribute to the strength of the total brazing sheet product. Further, it allows that Mg-containing brazing sheet may be applied in both Vacuum Brazing and flux-less Controlled Atmosphere Brazing. The latter possibility has many economical and technical advantages. The brazing sheet according to the invention may be readily used in the existing industrial brazing lines without the change of relevant process parameters, such as temperature and processing time.

In another embodiment the clad layer comprises, in weight %, Si in the range of 2 to 18% and Zn in the range of up to 5%. Preferably the Zn is in the range of 0.5 to 3%. Further alloying elements may be added such as, but not limited to, Mg, Cu and Mn in suitable ranges. In accordance with the invention it has been found that when this brazing sheet is used the presence of Zn in the cladding has no detrimental effects during brazing. This is a major improvement over known brazing sheets. It allows for the design of a cladding which may contribute to the strength of the total brazing sheet product. Further, the brazing sheet product wherein the cladding contains Zn as a deliberate alloying element may be applied in both Vacuum Brazing and flux-less Controlled Atmosphere Brazing, both processing being used on an industrial scale.

Typically in the brazing sheet product according to the invention the core sheet is an aluminium alloy but the invention is not limited to this and any suitable material may be used. It is necessary that the core sheet has a melting point higher than that of the filler material (i.e. all layers which melt during brazing to generate the brazing alloy).

In one preferred embodiment, the core sheet is an aluminium alloy comprising Mg in a range of up to 8%. In a preferred embodiment Mg is in a range of 0.5 to 5.0 wt. %. Further alloying elements may be added such as, but not limited to, Cu, Zn, Bi, V, Fe, Zr, Ag, Si, Ni, Co and Mn in suitable ranges. It has been found that when the brazing sheet of the invention is used, the presence of Mg in the clad layer has no detrimental effects during brazing. This is a major improvement over the known brazing sheets. The diffusion of Mg from the core to the cladding during the manufacturing of the brazing sheet product itself and its application in a subsequent brazing process, appears to have no detrimental effects on the brazeability of the brazing sheet in accordance with the invention. This allows for the design of high strength brazing sheet product having an aluminium core sheet having Mg in the given range as a strengthening element. The product may be applied in both Vacuum Brazing and flux-less Controlled Atmosphere Brazing, both processes being used on an industrial scale.

In the brazing sheet product according to the invention the core sheet may be coupled to the clad layer via an intermediate layer. The benefits of having such an intermediate layer or interlayer are described in for example U.S. Pat. No. 2,821,014, the contents of which are incorporated here by reference.

In a further aspect of the invention there is provided in a method a manufacturing a brazed assembly using brazing sheet product in accordance with the invention, comprising the steps of:

(a) shaping parts of which at least one is made from the brazing sheet product of the invention as set out above;
(b) assembling the parts into the assembly;
(c) brazing the assembly under a vacuum or in an inert atmosphere in the absence of a brazing-flux at elevated temperature for a period long enough for melting and spreading of the cladding alloy;
(d) cooling the brazed assembly. The cooling rate may be in the range of typical brazing furnace cooling rates. Typical cooling rates are a cooling rate of at least 10° C./min or more.

In dependence on the material, particularly aluminium alloy, of the core sheet the process may include the further processing step (e) of ageing of the brazed and cooled assembly in order to optimise the mechanical and corrosion properties of the assembly.

BRIEF DESCRIPTION OF THE DRAWINGS

The invention will now be illustrated by several non-limitative examples, and with reference to the drawings, wherein.

DETAILED DESCRIPTION OF THE PREFERRED EMBODIMENTS

Figure 1:
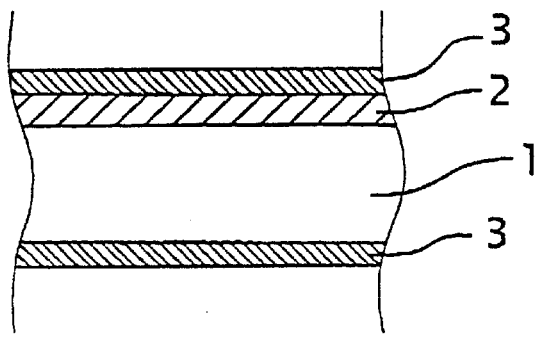
FIG. 1 is a schematic longitudinal section showing the structure of brazing sheet product according to the state of the art.

FIG. 1 shows schematically brazing sheet in accordance with the prior art as would be obtained by the process in accordance with for example U.S. Pat. No. 3,970,237. The brazing sheet product consists of a core sheet 1 clad on one or both sides clad with a cladding layer 2 comprising an Al—Si-alloy. On top of the clad 2 a thin nickel layer 3, preferably a nickel-lead layer, is applied by means of electroplating.

Figure 2:
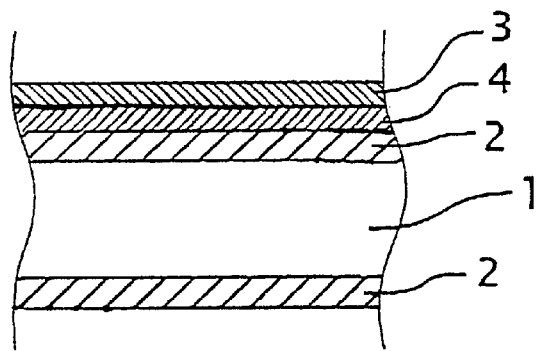
FIG. 2 in a schematic longitudinal section showing the structure of brazing sheet product according to the invention.

FIG. 2 shows schematically brazing sheet in accordance with the present invention where between the cladding layer 2 and the Ni-layer 3 a further layer 4 of zinc or tin is applied, the advantages of which are set out above. In FIG. 2 the layers 4 and 3 have been shown on only one aide of the brazing sheet, but it will be immediately apparent to the skilled person that they may also be applied on both sides of the brazing sheet product. The composition of the various layers and their advantages have been set out above.

Figure 3:
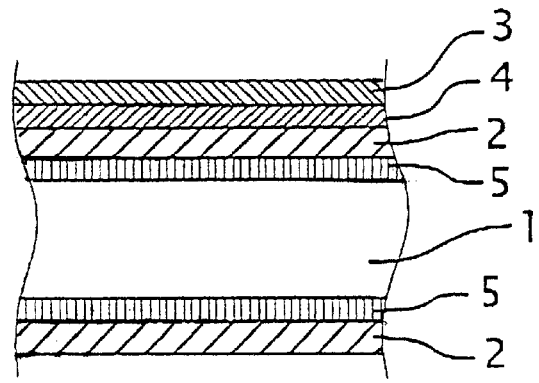
FIG. 3 is a schematic longitudinal section showing the structure of brazing sheet product according to the invention.

FIG. 3 shows schematically a further brazing sheet in accordance with the present invention which has the layers of FIG. 2 and a further intermediate layer 5 between the core sheet 1 and the cladding layer 2 on both sides. In FIG. 3 the layers 4 and 3 have been shown on only one side of the brazing sheet, but it will be immediately apparent to the skilled person that they may also be applied on both sides of the brazing sheet product. In addition the intermediate layer 5 may also be applied on one side of the brazing sheet, preferably on the side comprising also the layers 4 and 3. The possible compositions of the various layers and their advantages have been set out above.

Figure 4B:
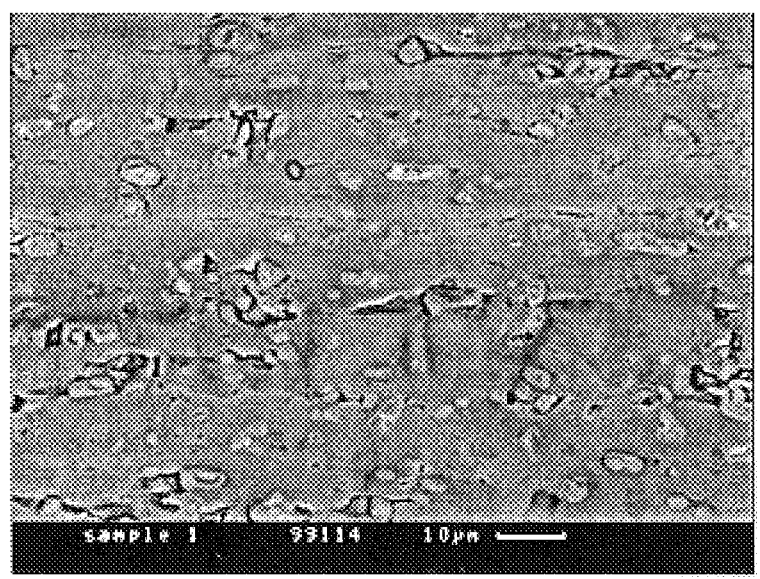
FIGS. 4A and 4B are SEM photographs of the surface after Ni-plating according to the prior art and in accordance with the present invention respectively.
Figure 4A:
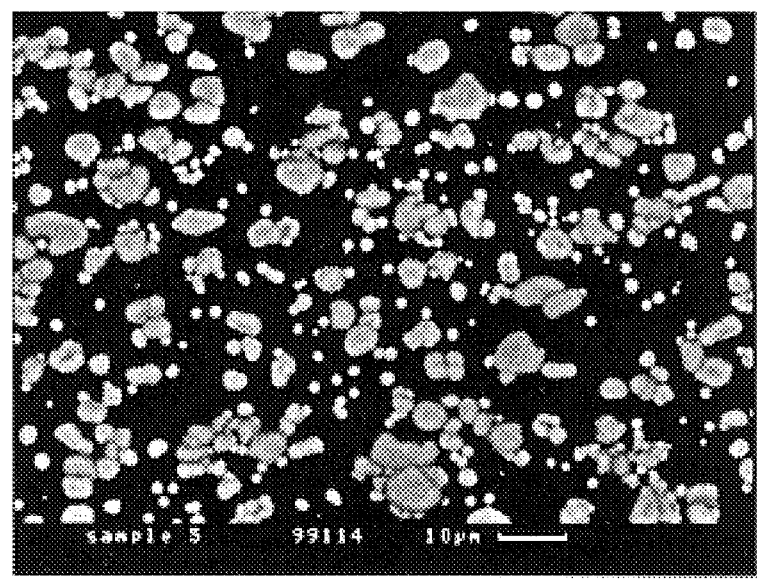

FIG. 4A is a SEM back-scatter photograph (magnification 1000x) of the surface of 0.5 μm Ni-plated brazing sheet in accordance with the prior art as described in U.S. Pat. No. 3,970,237. Globules of Ni can be observed which are preferentially deposited on the Si-particles of the clad layer of the brazing sheet. FIG. 4B represents a SEM back-scatter photograph (magnification 1000×) of the surface of 0.5 μm Ni-plated brazing sheet in accordance with the invention having a Zn layer under the Ni layer and here it can be observed that the Ni is deposited much more uniformly and smoothly over the entire surface giving rise to several advantages during brazing as set out above.

EXAMPLES

Example 1

On a laboratory scale, testing was carried out on aluminium brazing sheet manufactured from an AA3003 core alloy clad on both sides with an AA4045-series clad alloy, having a total thickness of 0.5 mm, the thickness of each clad being 10.9% of the total thickness. The composition of theme alloys is given in Table 1.

TABLE 1

|  | Weight % | |
|---|---|---|
|  | AA 3003 | AA 4045 |
| Si | 0.6 max. | 9.0–11.0 |
| Fe | 0.7 max. | 0.8 max. |
| Cu | 0.05–0.20 | 0.30 max. |
| Mn | 1.0–0.20 | 0.05 max |
| Mg | — | 0.05 max. |
| Zn | 0.10 max. | 0.10 max. |
| Ti | — | 0.20 max. |
| impurities | each 0.05 total 0.15 | each 0.05 total 0.15 |
| balance | aluminium | aluminum |

Each sample was treated by the following sequential process steps (see also Table 2),
  cleaning by immersion for 180 s in ChemTec 30014 (a commercial available bath),
  rinsing, alkaline etching for 20 s in ChemTec 30203 (a commercial available bath component),
  rinsing, optionally desmutting for 4 s in an acidic oxidising Solution, typically 25–50 vol. % nitric acid, comprising ChemTec 11093 (a commercial available pickle activator) at ambient temperature, followed by rinsing,
  optional zincate immersion using ChemTec 024202 for 12 s at room temperature, followed by rinsing,
  nickel electroplating, and
  rinsing.

For the nickel electroplating two different types of solutions were used, a basic bath and an acid bath, see also Table 2.

The acid bath comprised 270 g/l nickel sulphate, 50 g/l nickel chloride, 30 g/l boric acid. The plating conditions at 50° C. were such that a nickel layer of 2 μm is present after the plating process using a current density of 5 A/dm². This acid bath is also known as the Watt's process.

The basic bath comprised 50 g/l nickel sulphate, 50 g/l nickel chloride, 100 g/l sodium citrate, 1 g/l lead acetate, and 75 ml/l ammonium hydroxide (30%). The plating conditions at 26° C. were such that a plating time of 50 s resulted in a nickel-lead plated layer of 0.5 μm thickness using a current density of 3 A/dm², and a plating time of 200 s resulted in a nickel-lead plated layer of 2.0 μm thickness.

The nickel plated specimens have been tested for adhesion using the Erichsen dome test (5 mm), and the T-bend test. A value assessment is then given to the adhesion where: (−)=poor, (±)=fair, and (+)=good. The morphology of the nickel layer applied has been investigated using SEM/EDX, where: U=uniform nickel layer (shiny appearance), and (G)=nickel globules preferentially deposited on the silicon particles (dull appearance). Further the brazeability has been assessed. On a laboratory scale of testing the brazing tests were carried out in a small quartz furnace. Small coupons of 25 mm×25 mm were cut from the nickel-plated sheets. A small strip of an AA3003 alloy measuring 30 mm×7 mm×1 mm was bent in the centre to an angle of 45° and laid on the coupons. The strip on the coupon samples were heated under flowing nitrogen, with heating from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)= good brazeability, and (+)=excellent brazeability. The results obtained are summarised in Table 2.

From the results of Table 2 it can been seen that in case of a zinc immersion pretreatment step, a uniform nickel or nickel-lead layer is obtained having a shiny appearance. Further it can be seen that with a basic bath a zinc immersion pretreatment is required to obtain a good adhesion of the electroplated nickel layer. Further it can be seen that a nickel-lead layer of 0.5 μm has better brazeability characteristics than a layer of 2.0 μm thickness; in the latter case wrinkles have been observed. The brazeability of the material obtained via the basic bath route has better brazeability characteristics (but still acceptable) than material obtained via the acid bath route, possibly due to the presence of lead in the electroplated layer.

TABLE 2

Experimental conditions and results.

| Plating bath | acid | acid | acid | basic | basic | basic | basic |
|---|---|---|---|---|---|---|---|
| Desmutting[s] | 4 | 4 | — | 4 | — | 4 | — |
| Zinc immersion time[s] | — | 12 | 12 | — | 12 | 12 | 12 |
| Nickel plating time[s] | 120 | 120 | 120 | 200 | 200 | 50 | 50 |
| Adhesion | − | + | + | − | + | + | + |
| Brazeability | −/± | −/± | −/± | ± | ± | + | + |
| Morphology | G | U | U | G | U | U | U |

Example 2

On a laboratory scale of testing aluminium brazing sheets manufactured from an AA3003 core alloy clad on one side with AA4000-series clad alloys of six different compositions (see Table 3), and having a total thickness of 0.5 mm, and a clad thickness of about 50 μm, were treated as set out in Table 4.

The treatment consisted of:
  cleaning by immersion for 180 s in ChemTec 30014 (a commercial available bath),
  rinsing, alkaline etching for 20 s in ChemTec 30203 (a commercial available pickle activator) at ambient temperature, rinsing,
  optionally desmutting for 4 s in an acidic oxidizing bath, typically 25–50 vol % nitric acid, comprising ChemTec 11093 at ambient temperature, followed by rinsing,
  optional zincate immersion using ChemTec 024202 for 12 s at room temperature followed by rinsing,
  nickel electroplating, and
  rinsing.

For the nickel electroplating two different types of solutions have been used: a basic bath with lead and a basic bath without lead.

The lead-containing basic bath comprised 50 g/l nickel sulphate, 50 g/l nickel chloride, 30 g/l sodium citrate, 1 g/l lead-acetate and 75 ml/l ammonium hydroxide (30%). the plating conditions at 26° C. were such that a plating time of 50 s resulted in a nickel-lead plated layer of 0.5 μm thickness using a current density of 3 A/dm$^2$. The process using this bath is in Table 4 referred to as "L+".

The lead-free basic bath comprised 50 g/l nickel sulphate, 50 g/l nickel chloride, 30 g/l sodium citrate, and 75 ml/l ammonium hydroxide (30%). The plating conditions at 26° C. were such that a plating time of 50 s resulted in a nickel-lead plated layer of 0.5 μm thickness using a current density of 3 A/dm$^2$. The process using this bath is in Table 4 referred to as "L–".

The samples were tested as in Example 1 set out above, The results are set out in Table 4. In this table "n.t." stands for not tested.

From the results in Table 4 it can be seen that a zincate treatment in accordance with the invention succeeds in achieving good adhesion of the Ni-plated layer. From the results of clad alloy no. 1 it can be seen that omitting the desmutting step still results in a good adhesion of the Ni-plated layer. An excellent brazeability can be achieved using a wide variety of cladding compositions. The presence of Mg in clad layer no. 3 has no detrimental effect of the brazeability of the brazing sheet. The presence of Zn in clad layer no. 5 has no detrimental effect of the brazeability of the brazing sheet.

TABLE 3

Composition of the clad alloy, in weight %.
Balance Al and inevitable impurities.

| Alloy | Si | Fe | Cu | Mn | Mg | Zn | Ti | Bi | Sr |
|---|---|---|---|---|---|---|---|---|---|
| 1 | 10.0 | 0.3 | <0.01 | <0.02 | <0.02 | <0.02 | 0.003 | — | — |
| 2 | 10.0 | 0.3 | <0.01 | <0.02 | <0.02 | <0.02 | 0.003 | — | — |
| 3 | 9.6 | 0.25 | <0.01 | <0.02 | 1.32 | <0.02 | 0.003 | — | — |
| 4 | 7.6 | 0.3 | <0.01 | <0.02 | <0.02 | <0.02 | 0.003 | — | 0.02 |
| 5 | 7.6 | 0.35 | <0.01 | <0.02 | <0.02 | 1.02 | 0.003 | — | — |
| 6 | 12.4 | 0.2 | <0.01 | 0.06 | <0.02 | <0.02 | 0.003 | — | — |

TABLE 4

Pretreatment applied and testing results.

| Clad alloy no. | Clean. | Etching | Desmut. | Zincate | Ni-plating | Adhesion | Brazeability |
|---|---|---|---|---|---|---|---|
| 1 | yes | yes | yes | yes | L– | + | – |
| 1 | yes | yes | no | yes | L– | + | – |
| 2 | yes | yes | yes | yes | L+ | + | + |
| 2 | yes | yes | yes | no | L+ | – | n. t. |
| 3 | yes | yes | yes | yes | L+ | + | + |
| 3 | yes | yes | yes | no | L+ | – | + |
| 4 | yes | yes | yes | yes | L+ | + | + |
| 4 | yes | yes | yes | no | L+ | – | n. t. |
| 5 | yes | yes | yes | yes | L+ | + | + |
| 5 | yes | yes | yes | no | L+ | – | + |
| 6 | yes | yes | yes | yes | L+ | + | + |
| 6 | yes | yes | yes | no | L+ | – | n. t. |

Example 3

In this example, bismuth was included in the zinc bonding layer, in order to reduce the surface tension of the molten brazing alloy formed by the clad layer and the layers above it during brazing. The sheet product on which the bonding layer was applied consisted of a core of alloy AA3003 (78.2% by weight) and two clad layers of alloy AA4045 (10.9% by weight each), total thickness 0.5 mm.

The displacement plating bathe used in several trials were as shown in Table 5, which also shows the results obtained in the adhesion test and brazeability tests carried out as in Example 1. The process steps were:

a. cleaning of clad surface, using bath of 35 g/l ChemTec 30014, 50° C., 180 s b. thorough rinsing c. alkaline etching, using bath of 30 g/l ChemTech 30203, 50° C., 20 s d. thorough rinsing e. desmutting, using 50% HNO$_3$, room temperature, 60 s f. thorough rinsing g. zincate immersion; see Table 5, to apply Zn—Bi layer of about 35 μm (about 0.25 g/m$^2$)

h. nickel plating, using the lead-free basic bath described above in Example 2, 26° C., 3 A/dm$^2$, 50 s, corresponding to Ni layer thickness of 0.5 μm (4.5 g/m$^2$)

TABLE 5

| Zn-Bi bath | 1 | 2 | 3 | 4 |
|---|---|---|---|---|
| Sodium hydroxide g/l | 120 | 120 | 120 | 120 |
| Zinc oxide g/l | 20 | 20 | 20 | 20 |
| Potassium sodium tartrate g/l | 50 | 50 | 50 | 50 |
| Sodium nitrate g/l | 1 | 1 | 1 | 1 |
| Bismuth (III) oxide g/l | 0 | 10 | 2 | 1 |
| Plating time s | 12 | 12 | 12 | 12 |
| Appearance of 'bonding' layer | silver metallic | black powdery | grey | silver metallic |
| Composition of ZnBi layer from ICP data g/m$^2$ | | Bi: 0.7 Zn: 0.35 | | Bi: 0.05 Zn: 0.25 |
| Nickel plating | 50 s | 50 s | 50 s | 50 s |
| Adhesion test | excellent | very poor | poor | excellent |
| Brazeability test | — | + | + | + |

The composition of the layer from bath 3 was not measured. ICP stands for induced coupled plasma.

The results here show that the inclusion in the thin bonding layer of even a small amount of Bi, as an example of an element reducing surface tension of the molten brazing alloy, achieves a significant effect on brazing performance. However the presence of Bi in the bonding layer reduces the adhesion effect achieved, while still permitting brazing. The weight of Zn in the layer should preferably be at least 50%, more preferably at least 75%. Clearly the amount of addition of an element such as Bi which can be achieved in the thin bonding layer is small, but the effect is significant, and a lead-free product was obtained. Avoidance of lead has environmental benefits.

Example 4

This example shows how, following the application of a zinc bonding layer as in Examples 1 and 2, an electroplated nickel layer containing Bi, but no Pb, may be applied, resulting in a product having good adhesion of the nickel layer and good brazeability. Bismuth is not easily maintained in a stable nickel-plating solution, without sludge formation.

The nickel plating bath used has the composition of Table 6:

TABLE 6

| Compound | g/l |
|---|---|
| Nickel sulphate | 142 |
| Ammonium sulphate | 34 |
| Nickel chloride | 30 |
| Sodium citrate | 140 |
| Sodium gluconate | 30 |
| Bismuth ions | 1 |

Following the procedure of Examples 1 and 2, using a product having a clad of AA4045 alloy, with a Zn bonding layer, electroplating of a Ni—Bi layer was performed at 57° C. according to Table 7:

TABLE 7

| Current Density A/dm$^{-2}$ | time s | Ni g m$^{-2}$ (ICP) | Bi g m$^{-2}$ (ICP) | adhesion | braze-ability |
|---|---|---|---|---|---|
| 3 | 50 | 9.1 | 0.66 | + | + |
| 6 | 25 | 10.4 | 0.50 | + | + |
| 10 | 15 | 9.5 | 0.46 | + | + |

The current efficiency of Ni deposition appears to be 100%.

The samples plated at 3 A/dm$^{-2}$ showed some black spots, but the samples plated at the higher current densities have excellent appearance. About 0.5 g m$^{-2}$ bismuth was deposited. The bismuth content of the deposited alloy layer can easily be varied, e.g. by lowering the bismuth concentration in the plating bath, to give a lower Bi content.

This plating bath has many advantages compared to the standard Pb-containing baths:
- no ammonia fumes
- more practical operating temperatures, typically 40–70° C.
- high current density
- bismuth can easily be replenished to the plating bath.

Further, standard chemicals were employed.

Having now fully described the invention, it will be apparent to one of ordinary skill in the art that many changes and modifications can be made without departing from the spirit or scope of the invention as herein described.

What is claimed is:

1. A method of manufacturing a brazing sheet product, comprising the steps of:
   plating a layer comprising nickel onto a surface of a sheet comprising a core sheet and a clad layer on the core sheet, the clad layer being made of an aluminium alloy containing silicon in an amount in the range 2 to 18% by weight and said surface being a surface of the clad layer, and
   pretreating said surface before the plating step, wherein the pretreating comprises applying a bonding layer comprising zinc or tin on said surface.

2. The method according to claim 1, wherein said bonding layer is applied by a zincate treatment or a stannate treatment.

3. The method according to claim 2, wherein said bonding layer is applied by an immersion zincate treatment or an immersion stannate treatment.

4. The method according to claim 2, wherein the duration of the zincate or stannate treatment is in the range 1 to 300 seconds.

5. The method according to claim 2, wherein the temperature of the zincate or stannate treatment is in the range of 10 to 50° C.

6. The method according to claim 1, wherein said bonding layer has a thickness of not more than 1 μm.

7. The method according to claim 6, wherein said bonding layer has a thickness in the range 10 to 150 nm.

8. The method according to claim 1, wherein said layer comprising nickel is applied by electroplating.

9. The method according to claim 8, wherein said electroplating is carried out in a sulfamate solution.

10. The method according to claim 9, wherein said sulfamate solution contains lead, whereby said nickel layer contains lead.

11. The method according to claim 8, wherein said layer comprising nickel is applied by electroplating in which one or more process parameters are selected, from:
    (a) electroplating bath temperature 20–70° C.;
    (b) electroplating bath pH 7.0–12.0;
    (c) current density of 0.1–10.0 A/dm$^2$;
    (d) plating time 1 to 300 seconds;
    (e) bath composition comprising 3–200 g/l nickel sulfate, 10–100 g/l nickel chloride, 60–300 g/l sodium citrate, 0.05–10.0 g/l lead acetate, and 5–150 ml/l ammonium hydroxide (calculated as 30% ammonium hydroxide solution).

12. The method according to claim 8, wherein said layer comprising nickel is applied by electroplating in which one or more process parameters are selected from:
    (a) electroplating bath temperature 20–70° C.;
    (b) electroplating bath pH in the range of 3 to 5;
    (c) current density of 0.1–10.0 A/dm$^2$;
    (d) plating time 1 to 300 seconds;
    (e) bath composition comprising 5–400 g/l nickel sulfate, 10–100 g/l nickel chloride, 5–100 g/l boric acid.

13. The method according to claim 1, wherein the amount of silicon in said clad layer is in the range 7 to 18% by weight.

14. A brazing sheet product comprising a core sheet (1), a clad layer (2) on said core sheet (1) made of an aluminium alloy containing silicon in an amount in the range 2 to 18% by weight, a layer (3) comprising nickel on the outer surface of said clad layer, and a layer (4) comprising zinc or tin as a bonding layer between said outer surface of said clad layer and said layer comprising nickel.

15. The brazing sheet product according to claim 14, wherein said clad layer (2) has discrete silicon-rich particles exposed at said outer surface thereof, and said layer (3) comprising nickel is bonded both to said silicon-rich particles and to the areas of said outer surface between said silicon-rich particles, so as to form a continuous layer on said outer surface.

16. The brazing sheet product according to claim 14, wherein said bonding layer (4) is an electroplated layer.

17. The brazing sheet product according to claim 14, wherein said bonding layer (4) has a thickness of not more than 0.5 μm.

18. The brazing sheet product according to claim 14, wherein said bonding layer (4) has a thickness in the range 20 to 150 nm.

19. The brazing sheet product according to claim 14, wherein said layer (3) comprising nickel has a thickness of not more than 2.0 μm.

20. The brazing sheet product according to claim 14, wherein taken together said clad layer and all layers exterior thereto, have a composition containing at least one of the following elements, Bi in the range of 0.01 to 0.5% by weight, Mg in the range 0.2 to 2.0% by weight, and Sb in the range of 0.01 to 0.5% by weight.

21. The brazing sheet product according to claim 14, wherein said bonding layer (4) contains by weight an amount not more than 50%, in total of one or more elements selected from bismuth, lead, lithium and antimony.

22. The brazing sheet product according to claim 14, wherein said clad layer (2) contains by weight Mg in an amount of at most 8%.

23. The brazing sheet product according to claim 14, wherein said clad layer (2) contains by weight Zn in an amount of at most 5%.

24. The brazing sheet product according to claim 14, wherein said core sheet (1) is an aluminium alloy.

25. The brazing sheet product according to claim 24, wherein said core sheet (1) is an aluminium alloy comprising Mg in an amount of at most 8%.

26. The brazing sheet product according to claim 14, wherein said core sheet (1) is coupled to said clad layer (2) via an intermediate layer (5).

27. An assembly of components joined by brazing, at least one said components being a brazing sheet product according to claim 14.

28. A method of manufacturing an assembly of brazed components, comprising the steps of:

(a) forming said components of which at least one is made from brazing sheet product according to claim 14;

(b) assembling the components into the assembly;

(c) brazing the assembly under a vacuum or in an inert atmosphere in the absence of a brazing-flux at elevated temperature for a period long enough for melting and spreading of the clad layer;

(d) cooling the brazed assembly.

29. The method of claim 6, wherein said bonding layer has a thickness of not more than 0.3 $\mu$m.

30. The method according to claim 8, wherein said layer comprising nickel is applied by electroplating in which one or more process parameters are selected from:

(a) electroplating bath temperature 20–30° C.;

(b) electroplating bath pH 10.0–12.0;

(c) current density of 0.5–4.0 A/dm$^2$;

(d) plating time 30 to 100 seconds;

(e) bath composition comprising 3–200 g/l nickel sulfate, 10–100 g/l nickel chloride, 60–100 g/l sodium citrate, 0.05–10.0 g/l lead acetate, and 5–150 ml/l ammonium hydroxide (calculated as 30% ammonium hydroxide solution).

31. The method of claim 11, wherein the electroplating bath pH is about 10.5 and the bath composition comprises about 100 g/l sodium citrate.

32. The method according to claim 8, wherein said layer comprising nickel is applied by electroplating in which one or more process parameters are selected from:

(a) electroplating bath temperature 40 to 60° C.;

(b) electroplating bath pH in the range of 4 to 5;

(c) current density of 0.5 to 5.0 A/dm$^2$;

(d) plating time 20 to 100 seconds;

(e) bath composition comprising 240–300 g/l nickel sulphate, 40–60 g/l nickel chloride, 25–40 g/l boric acid.

33. The brazing sheet product according to claim 14, wherein said bonding layer (4) has a thickness of not more than 0.3 $\mu$m.

34. The brazing sheet product according to claim 14, wherein said layer (3) comprising nickel has a thickness of not more than 1.0 $\mu$m.

35. The brazing sheet product according to claim 14, wherein taken together said clad layer and all layers exterior thereto, have a composition containing at least one of the following elements, Bi in the range of 0.05 to 0.5% by weight, Mg in the range 0.2 to 2.0% by weight, and Sb in the range of 0.05 to 0.5% by weight.

36. The brazing sheet product according to claim 14, wherein said bonding layer (4) contains by weight an amount of not more than 25%, in total of one or more elements selected from bismuth, lead, lithium and antimony.

37. The brazing sheet product according to claim 14, wherein said clad layer (2) contains by weight Mg in an amount in the range of 0.5 to 5%.

38. The brazing sheet product according to claim 14 wherein said clad layer (2) contains by weight Zn in an amount in the range of 0.5 to 3%.

* * * * *

UNITED STATES PATENT AND TRADEMARK OFFICE
CERTIFICATE OF CORRECTION

PATENT NO.    : 6,379,818 B1
DATED         : April 30, 2002
INVENTOR(S)   : Joop Nicolaas Mooij et al.

It is certified that error appears in the above-identified patent and that said Letters Patent is hereby corrected as shown below:

<u>Title page,</u>
Item [75], the third inventor's name is -- Jacques Hubert Olga Joseph Wijenberg --.

Signed and Sealed this

Tenth Day of December, 2002

JAMES E. ROGAN
*Director of the United States Patent and Trademark Office*